United States Patent [19]
Angeli et al.

[11] Patent Number: 5,560,944
[45] Date of Patent: Oct. 1, 1996

[54] PROCESS FOR THE INDUSTRIAL PREPARATION OF PIZZERIA PIZZAS

[75] Inventors: Alessandro D. Angeli, Parma; Dalbon Gerardo, Daré, both of Italy

[73] Assignee: M. G. Braibanti S.p.A., Milan, Italy

[21] Appl. No.: 314,062

[22] Filed: Sep. 28, 1994

Related U.S. Application Data

[63] Continuation of Ser. No. 6,264, Jan. 19, 1993, abandoned.

[30] Foreign Application Priority Data

Jan. 22, 1992 [IT] Italy ................... MI92A0100

[51] Int. Cl.$^6$ ................ A21D 8/04; A23L 1/105
[52] U.S. Cl. ................ 426/27; 426/290; 426/293; 426/296; 426/504
[58] Field of Search ................ 426/27, 290, 291, 426/292, 293, 296, 302, 503, 504, 505

[56] References Cited

U.S. PATENT DOCUMENTS

| | | | |
|---|---|---|---|
| 3,667,963 | 6/1972 | Katter et al. | 426/293 |
| 3,845,219 | 10/1974 | Federico | 426/27 |
| 4,208,441 | 6/1980 | Westover | 426/293 |

FOREIGN PATENT DOCUMENTS

| | | |
|---|---|---|
| 717812 | 12/1968 | Belgium . |
| A0069078 | 1/1983 | European Pat. Off. . |
| A4016944 | 11/1991 | Germany . |
| 368396 | 3/1932 | United Kingdom . |
| 2165436 | 4/1986 | United Kingdom . |
| A8503847 | 9/1985 | WIPO . |

OTHER PUBLICATIONS

Tressler et al, *Food Products Formulary*, vol. 2, 1975, p. 155.
Matz, Formulas and Processes For Bakers, 1987, Pan–Tech International, pp. 300–306.
Matz, Equipment For Bakers, 1988, Pan–Tech International, pp. 230–237.

*Primary Examiner*—Arthur L. Corbin
*Attorney, Agent, or Firm*—Hedman, Gibson & Costigan, P.C.

[57] ABSTRACT

This invention relates to a process for the industrial preparation of pizzeria pizzas. The process comprises the following stages: a) dough preparation, b) kneading, c) raising, d) portioning, e) topping, and f) baking.

10 Claims, 1 Drawing Sheet

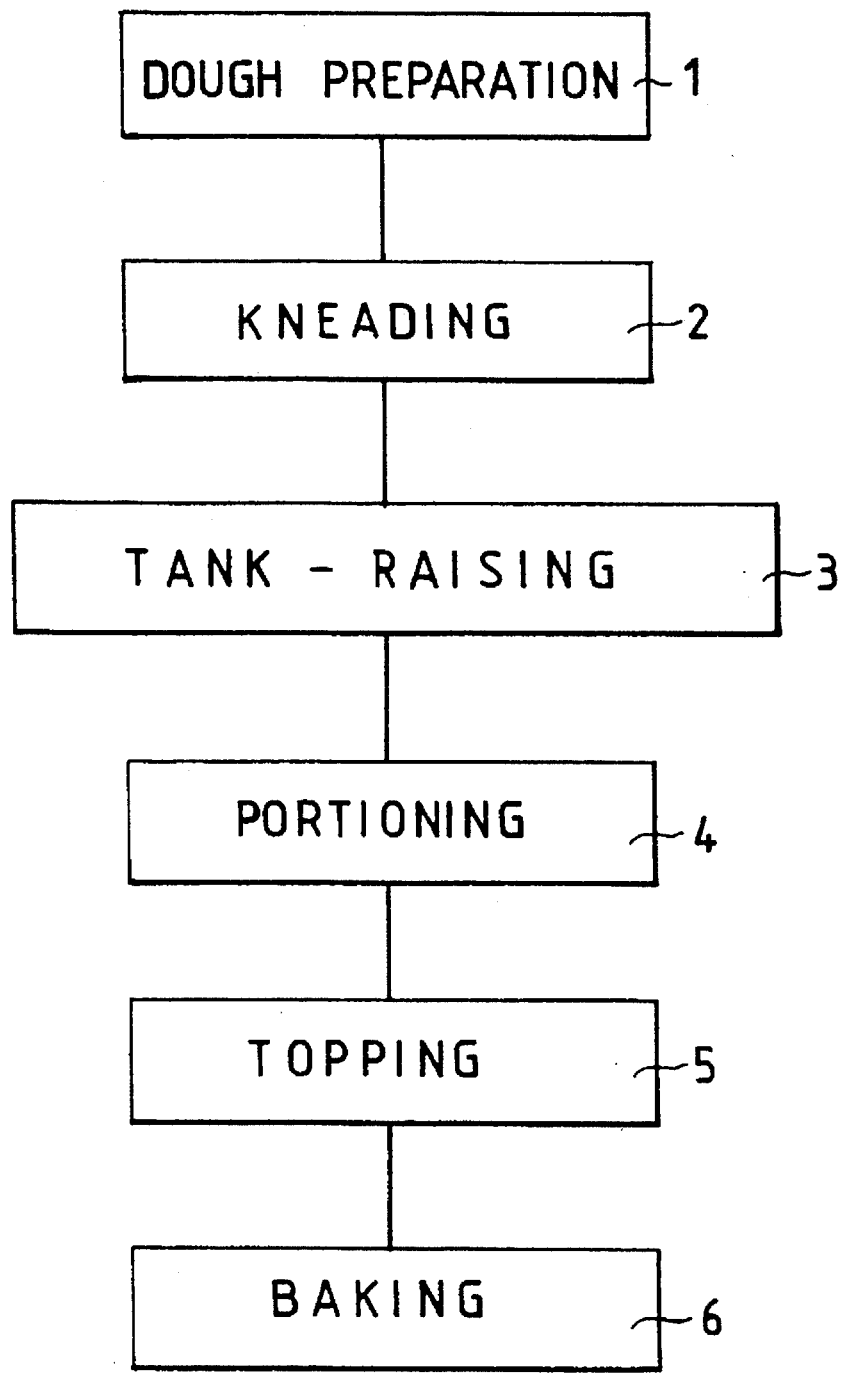

PROCESS FOR THE INDUSTRIAL PREPARATION OF PIZZERIA PIZZAS

This is a continuation of application Ser. No. 08/006,264, filed Jan. 19, 1993, now abandoned.

BACKGROUND OF THE INVENTION

This invention relates to a process for the industrial preparation of pizzeria pizzas.

Industrial processes for preparing pizzas are known in the prior art, but the product obtained is generally in the form of the so-called industrial pizza/focaccia. This is a product generally without the outer raised edge and without the special characteristics of pizzas eaten in artisan pizzerias, the so-called pizzeria pizzas.

A pizzeria pizza means a pizza with the following special characteristics:

a diameter of between 20 and 35 cm, a compact non-cellular or only minimally cellular structure of the dough below the topping, and a circular outer raised edge 1–2 cm high which is more baked and blistered. This pizza is easy to chew, is not rubbery or hard, is fragrant and is not greasy.

One of the processes of the known art comprises a first dough preparation stage followed by kneading, portioning into balls of dough and rounding them. Raising by yeast action then follows in suitable cells at a temperature of between 30° and 35° C. for a time of between 20 and 45 minutes, under an optimum relative humidity of between 70 and 85%.

This is followed by rolling, topping, baking in an oven at 250°–280° C. for 10–12 minutes, and finally packaging and/or deep-freezing.

Another known industrial process comprises dough preparation followed by kneading, raising in cells, extrusion into slabs of dough, rolling into a thin sheet, and punching to obtain a round product of the desired diameter and thickness.

The known art has many drawbacks.

Firstly the product obtained does not have the special characteristics of the pizzeria pizza.

In this respect raising the punched or ball-produced pizza in a cell at 30°–35° C. always produces a more or less high cellular structure typical of the focaccia-type pizza, without the high blistered circular edge.

In addition the use of raising cells is expensive, in that they represent 30–40% of the total plant cost.

Baking then takes place in traditional ovens on a grid or on pans, with a relatively long baking time.

The initially stated known process suffers from a further drawback, in that rolling is carried out with only two pairs of mutually perpendicular rollers. This makes it necessary to add glutin breakdown additives and/or large quantities of fat in order to obtain good results, ie to make the ball soft and rollable. The addition of large quantities of additives and fats can in addition make the dough sticky.

SUMMARY OF THE INVENTION

The object of the present invention is to obviate the aforesaid drawbacks.

This object is attained by a process for the industrial preparation of pizzeria pizzas which comprises the following stages:

a) dough preparation
b) kneading
c) raising
d) portioning
e) topping
f) baking, characterised in that the raising stage c) is conducted directly in raising tanks.

BRIEF DESCRIPTION OF THE DRAWING

The drawing is a flow diagram showing the pizza preparation process.

DESCRIPTION OF THE PREFERRED EMBODIMENTS

The main advantage of the process according to the present invention is that as the raising stage takes place directly in the tank, raising cells are not required. This is particularly advantageous both in the operation of the plant and from a cost viewpoint.

The use of suitably arranged rollers for rolling enables a product of the required thickness to be obtained much more easily. It also enables the typical recipe for pizzeria pizzas to be used for dough preparation, without having to add additives and/or high percentages of fats.

The percentage of fats added is therefore less than or equal to 2%. It is also economically advantageous to use smaller-dimension ventilated ovens of refractory material to achieve shorter times and high temperature.

The technical characteristics and advantages of the present invention will be more apparent from the description given by way of non-limiting example with reference to the accompanying diagram, which is a schematic representation of the succession of stages in the process of the present invention.

In it the reference numeral 1 indicates the dough preparation stage, 2 the kneading stage, 3 the tank-raising stage, 4 the portioning stage, 5 the topping stage and 6 the baking stage. The said scheme therefore comprises a dough preparation stage 1 in which the dough is prepared by mixing flour, yeast, water and other ingredients together in the following proportions (expressed as parts by weight):

| | | |
|---|---|---|
| Flour 100 | W = 200–240 (flour force) | P/L = 0.4–0.6 (flour elasticity) |
| Water 50–65 | | |
| Yeast 4–8 | | |
| Salt 1–3 | | |
| Fats 1–2 | | |
| Saccharose 3–7 | | |
| Malt 3–4 | | |

Stage 2 then follows using a spiral kneader, involving a time generally of between 10 and 25 minutes.

The product obtained is then subjected to stage 3 of the present invention. Stage 3 consists of raising by yeast action directly in the tank at a temperature of between 25° C. and 35° C. for a time of between 20 and 45 minutes.

When risen, the dough undergoes stage 4 involving portioning. Portioning can be conducted in a piecing/rounding machine in which the dough is divided volumetrically into balls and then rounded.

The balls are then rolled by four pairs of rollers mutually perpendicular in pairs, or are pressed by a plate heated to 80°–120° C.

If portioning is done in the described manner, the result is known as a ball-type pizzeria pizza.

Alternatively, the portioning stage can be conducted by extruding the dough by means of a dough extruder of the known art, and punching.

Punching is effected after rolling, the rolling being again done by suitably arranged rollers to achieve a product of the desired thickness.

If portioning is done by the said three steps, ie extrusion, rolling and punching, the result is known as a rolled and punched pizzeria pizza.

The product from the portioning stage 4 is then subjected to the topping stage 5. This topping is done with tomato paste having a dry residue of 7–12% and using a quantity of between 0.4 and 0.8% of the dough. Cheese of mozzarella type, vegetables, salted meats etc. can also be used in addition to the tomato paste. Topping with the tomato paste must necessarily be done before baking, whereas the cheese, vegetables, salted meats etc. can be added after baking, especially if the product is to be deep-frozen. The product is then fed to the last stage of the process of the present invention, ie the baking stage 6, which is particularly important in obtaining pizzeria pizzas as the final product. For this, the oven used is of much smaller dimensions than traditional ovens. It can be gas, gas oil or electricity operated, and be of the type with either direct flame or only partially direct flame on the return refractory wall.

The baking base is of refractory material and the baking chamber has weak ventilation in its upper part. Optimum baking requires a temperature of between 300° C. and 550° C. for a time of between 30 and 150 seconds. Preferably the baking is carried out at a temperature of between 450° C. and 550° C. for a time of between 30 and 60 seconds.

This type of rapid baking at high temperature on refractory material with ventilation gives the dough the typical structure, taste and masticability of the pizzeria pizza.

The finished product obtained in this manner is then packaged and/or deep-frozen to ensure preservation of its organoleptic characteristics, and is then fed to distribution.

The advantage of the process according to the present invention is principally the obtaining of a pizzeria pizza by industrial preparation.

In addition the elimination of the raising cells results in a considerable cost saving.

The process of the present invention allows the production of true pizzeria pizzas in a single plant at a rate of between 1000 and 10000 pizzas per hour.

In addition to its providing the dough with the typical structure, taste and masticability of the pizzeria pizza, the use of ovens with the stated characteristics results in a considerable cost advantage.

We claim:

1. A process for the industrial preparation of pizzeria pizzas, consisting essentially of the following sequential stages:
   a) dough mixing
   b) kneading said dough
   c) raising said kneaded dough in raising tanks
   d) portioning said raised dough into pizza sized portions
   e) topping said pizza sized portions;
   f) baking the product of step e) at a temperature in the baking oven of between 300° C. and 550° C. and a residence time in the baking oven of between 30 and 150 seconds.

2. A process as claimed in claim 1, wherein a percentage of fats is added to the dough mixing stage which is less than or equal to 2%.

3. A process as claimed in claim 1, wherein the portioning stage d) comprises a step in which balls of dough are formed by a piecing/rounding machine and a rolling step.

4. A process as claimed in claim 3, wherein the rolling step in the portioning stage d) is effected by four pairs of mutually perpendicular rollers.

5. A process as claimed in claim 1, wherein the portioning stage d) comprises an extrusion step, a rolling step and a punching step.

6. A process as claimed in claim 1, wherein the baking stage f) takes place in an oven of refractory material which is ventilated in the upper part of the baking oven.

7. A process as claimed in claim 1, wherein the temperature is between 450° C. and 550° C. and the residence time is between 30 and 60 seconds.

8. A process as defined in claim 1 including the additional step of deep-freezing the pizza after baking.

9. A process for the industrial preparation of pizzeria pizzas, consisting of the following sequential steps:
   a) mixing a dough from flour, water, yeast, salt, fats, saccharose and malt;
   b) kneading the dough product of step (a) to form a kneaded dough product;
   c) raising said kneaded dough product in raising tanks to form a raised dough product at a temperature of from 30° to 35° C. for a time of between 20 and 45 minutes under a relative humidity of from 70 to 85%;
   d) portioning said raised dough product into pizza sized portions;
   e) topping said pizza sized portions with a pizza topping;
   f) baking said topped pizza in a baking oven at a temperature between 450° C. and 550° C. for a residence time in the baking oven of between 30 and 60 seconds.

10. A process as defined in claim 9 including the additional step of deep-freezing the pizza after baking.

* * * * *